No. 834,089. PATENTED OCT. 23, 1906.
W. H. WALLACE.
CAMERA.
APPLICATION FILED NOV. 21, 1905.

WITNESSES:

INVENTOR
William H. Wallace
BY
ATTORNEYS

UNITED STATES PATENT OFFICE.

WILLIAM HORTON WALLACE, OF NEW YORK, N. Y.

CAMERA.

No. 834,089.

Specification of Letters Patent.

Patented Oct. 23, 1906.

Application filed November 21, 1905. Serial No. 288,384.

*To all whom it may concern:*

Be it known that I, WILLIAM HORTON WALLACE, a citizen of the United States, and a resident of the city of New York, borough of Manhattan, in the county and State of New York, have invented a new and Improved Camera, of which the following is a full, clear, and exact description.

This invention relates to cameras. It is especially useful in connection with kodaks, but is applicable to cameras of other kinds.

The object of the invention is to produce an arrangement which will enable a camera to be focused upon a sensitized plate or film by means of an auxiliary focusing-screen, the general purpose being to enable a camera of one compartment to be used in this way without admitting injurious light to the sensitized plate and without necessitating the operator's perceiving the image actually formed at the position of the sensitized film or plate.

The invention consists in the construction and combination of parts, which will be set forth hereinafter and particularly pointed out in the claims.

Reference is to be had to the accompanying drawings, which illustrate as an example the preferred embodiment of my invention, in which drawings like characters of reference indicate like parts in both views, and in which—

Figure 1:
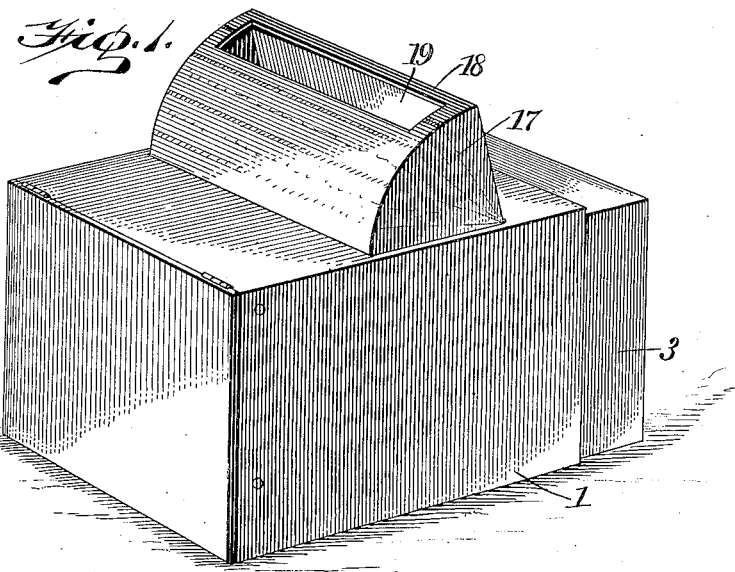
Figure 2:
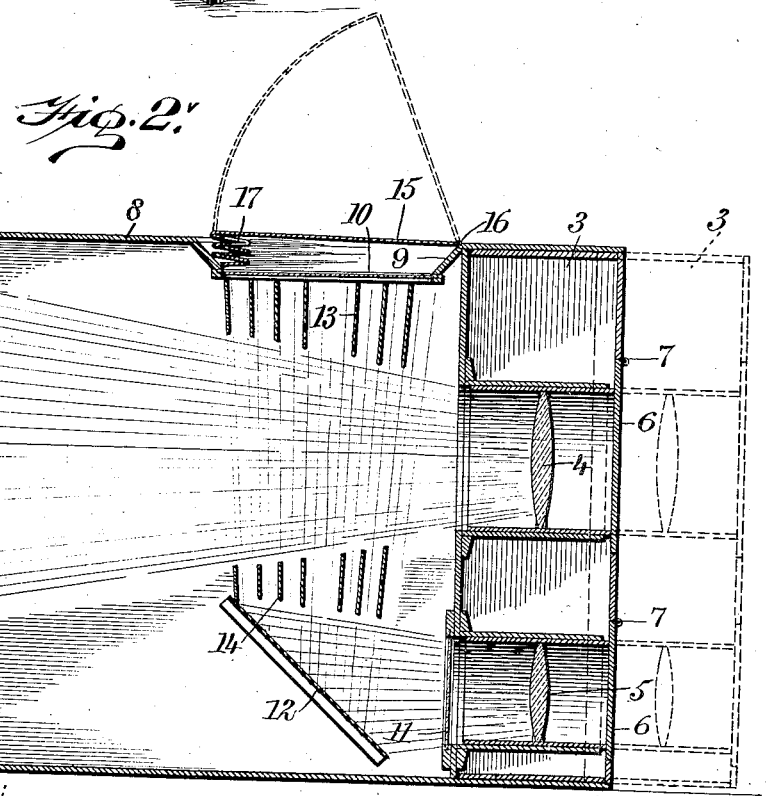

Figure 1 is a perspective view showing a camera to which my invention has been applied, and Fig. 2 is a longitudinal vertical section through this camera.

Referring more particularly to the parts, 1 represents the box of the camera, which may be of any common construction and provided with any suitable arrangement for focusing upon a sensitized member, such as a plate or film 2, held at the back of the camera. A simple arrangement for this purpose is illustrated, which consists in providing the camera with a telescoping front 3, which is adapted to be extended, as indicated in Fig. 1 and as indicated in the dotted outline in Fig. 2. This telescoping front is provided with a main lens or working lens 4, and this lens is in alinement with a similar focusing-lens 5. The openings in the telescoping front before these lenses are closed by doors 6, which swing upon hinges 7 in the common manner.

In the upper wall 8 of the camera-box 1 I provide a depression or recess 9, the bottom of which is formed of a colored focusing-screen 10. I prefer to make this colored screen of yellow ground glass. To the rear of the lens 5 I provide a colored screen 11, which is also preferably of yellow glass, and to the rear of this colored screen I provide in the camera-body a plane reflector 12, which is disposed, preferably, at an angle of forty-five degrees with the bottom wall of the camera-body, as shown. This reflector is disposed substantially beneath the screen 10 in such a way that an image thrown upon the reflector would be reflected up to the screen 10, as will be readily understood. Just below the screen 10 I provide the camera-body with a plurality of transverse bars or strips 13, which are preferably formed of light sheet-metal placed in a substantially vertical position, and just above the reflector 10 I provide similar transverse bars 14. These transverse bars 13 and 14 constitute a light-trap to prevent the light which is admitted at the screens 11 and 10 from reaching the sensitized member 2. The transverse bars 14 have a second and important function of screening the reflector 12 from light admitted at the main lens 4. These strips are preferably blackened, so that they do not reflect any light. The recess 9 is closed by a cover 15, which is hinged at its forward edge 16, so as to be raised, as indicated in the dotted outline in Fig. 2. To the free edges of this cover a cloth or fabric 17 is attached, which with the cover constitute a hood 18. (Shown most clearly in Fig. 1.) This cloth 17 is preferably black, so as to absorb the light, and at a suitable point it is provided with an opening or slot 19. This slot 19 is for the purpose of enabling the photographer to see an image which is formed upon the focusing-screen 10. When the camera is not in use, the cover 15 occupies a folded or closed position, as shown in Fig. 2, at which time the cloth 17 is disposed in folds lying in the recess 9. The two lenses 4 and 5 have the same focal lengths and distances, from which arrangement it follows that they may be focused simultaneously, and when the image upon the sensitized member 2 is in focus that upon the screen 10 will also be in focus. Hence it will be seen that by using the hood 18 the photographer may readily bring the camera to a nice focal adjustment without actually seeing the image cast at the point where the plate lies. By reason of the bars 13 and 14 direct rays of light from the screens 10 and 11 cannot pass to the sensitized plate. Furthermore, the color of these screens is selected with a view to minimizing the effect upon the plate of whatever reflected light may reach it.

Special attention is called to the fact that by the use of this invention light from the focusing-lens is admitted to the same compartment with the sensitized plate without being able to reach the plate or affect it in any way. On this account the camera is compact and its construction is simple. Attention is further called to the fact that the rays of light from the two lenses cross each other without producing any injurious effects. This makes it unnecessary to set the focusing-lens to one side and permits the adoption of the invention without increasing the width of the camera-box.

Having thus described the preferred form of my invention, what I claim as new, and desire to secure by Letters Patent, is—

1. A camera having an auxiliary lens, a reflector receiving light from said lens, a focusing-screen receiving the image from said reflector and a plurality of transverse bars, screening the sensitized plate from all rays of light admitted at said auxiliary lens, said rays of light passing between said transverse bars.

2. A camera having a colored focusing-screen visible from the exterior, an auxiliary lens throwing an image on said screen and transversely-extending bars directing all rays of light admitted at said lens upon said screen and excluding the light from the sensitized plate.

3. A camera having an auxiliary lens, a colored screen passing light from said lens, a colored focusing-screen visible from the exterior and receiving the image from said lens, and transverse bars screening the position of the sensitive plate.

4. A camera having an auxiliary lens, a focusing-screen visible from the exterior, a reflector throwing the image from said lens upon said screen, and transverse bars crossing the inner face of said screen and intercepting light which might pass therefrom to the position of the sensitive plate.

5. A camera having a front with an auxiliary lens, a reflector behind said lens, a focusing-screen in a wall of said camera and receiving the image from said reflector, a main lens, and transverse bars between which the light passes to said screen from said mirror, said bars intercepting the light which might pass from said main lens to said reflector.

6. A camera having a front, a main lens, and an auxiliary lens in said front, a colored screen behind said auxiliary lens and passing the image therefrom, an inclined reflector behind said auxiliary lens, a colored focusing-screen in the camera-wall receiving the image from said reflector, transverse bars crossing said focusing-screen and intercepting light therefrom, and other transverse bars near said reflector.

7. In a camera in combination, a box having a colored screen in the upper wall thereof, a main lens and an auxiliary lens, means for movably carrying said lenses, a reflector adapted to receive the image from said auxiliary lens and throw said image upon said screen, and a plurality of transverse bars between which the rays of light pass from said reflector to said screen, said bars constituting a trap for intercepting the light.

In testimony whereof I have signed my name to this specification in the presence of two subscribing witnesses.

WILLIAM HORTON WALLACE.

Witnesses:
  LOUIS F. BRAUN,
  CHAS. A. CONNER.